US012537317B2

(12) United States Patent
Alhasson

(10) Patent No.: US 12,537,317 B2
(45) Date of Patent: Jan. 27, 2026

(54) DUAL POLARIZED ANTENNA WITH DUAL FEED AND CROSS POLARIZATION ISOLATION

(71) Applicant: NXP B.V., Eindhoven (NL)

(72) Inventor: Saif Alhasson, Munich (DE)

(73) Assignee: NXP B.V., Eindhoven (NL)

( * ) Notice: Subject to any disclaimer, the term of this patent is extended or adjusted under 35 U.S.C. 154(b) by 433 days.

(21) Appl. No.: 17/724,102

(22) Filed: Apr. 19, 2022

(65) Prior Publication Data

US 2023/0335919 A1 Oct. 19, 2023

(51) Int. Cl.
*H01Q 21/24* (2006.01)
*H01Q 13/10* (2006.01)

(52) U.S. Cl.
CPC ............. *H01Q 21/24* (2013.01); *H01Q 13/10* (2013.01)

(58) Field of Classification Search
CPC ...... H01Q 21/24; H01Q 13/10; H01Q 25/001; H01Q 21/0043; H01P 5/024
See application file for complete search history.

(56) References Cited

U.S. PATENT DOCUMENTS 2,982,960 A * 5/1961 Shanks ................ H01Q 21/245
343/770
3,348,227 A 10/1967 Rolfs
3,680,139 A 7/1972 Reynolds, Jr.
5,541,612 A * 7/1996 Josefsson ............. H01Q 25/001
333/237
8,098,189 B1 * 1/2012 Woodell .................. G01S 7/025
342/26 B
2021/0405151 A1 12/2021 Sion et al.
2022/0066012 A1 3/2022 Jansen et al.

FOREIGN PATENT DOCUMENTS

CN 110867644 B 3/2020
JP 2012204975 A 10/2012
(Continued)

OTHER PUBLICATIONS

Four independent beams from a single linear array, in IEEE Transactions on Antennas and Propagation, vol. 13, No. 5, pp. 683-691, Sep. 1965, doi: 10.1109/TAP.1965.1138506 (Year: 1965).*
(Continued)

*Primary Examiner* — Hai V Tran
*Assistant Examiner* — Austin M Back

(57) ABSTRACT

A dual polarized antenna is described with a dual feed that is suitable for cross polarization isolation. In an example, an antenna has a waveguide having a first rectangular face at an end, a second rectangular face at a second opposite end, and a radiating face between the first rectangular face and the second rectangular face. A first feed is configured to feed a first radio signal having a first polarization into the waveguide. A second feed is configured to feed a second radio signal having a second polarization orthogonal to the first polarization into the waveguide. A first plurality of polarized emitters on the radiating face are arranged in a first line along the radiating face to emit the first radio signal, and a second plurality of polarized emitters on the radiating face are arranged in a second line along the radiating face to emit the second radio signal.

20 Claims, 6 Drawing Sheets

(56) References Cited

FOREIGN PATENT DOCUMENTS

| | | | |
|---|---|---|---|
| JP | 2013106301 | A | 5/2013 |
| KR | 102224626 | B1 | 3/2021 |

OTHER PUBLICATIONS

Shaver, R. J. (2015). Analysis of the Tapered Transition Waveguide [Master's thesis, Wright State University]. OhioLINK Electronic Theses and Dissertations Center. http://rave.ohiolink.edu/etdc/view?acc_num=wright1431711280 (Year: 2015).*

Four independent beams from a single linear array, in IEEE Transactions on Antennas and Propagation, vol. 13, No. 5, pp. 683-691, Sep. 1965, doi: 10.1109/TAP.1965.1138506 (Year: 2018).*

Goebels, F.J., "Four Independent Beams from a Single Linear Array", IEEE Transactions on Antennas and Propagation, vol. 13, Issue 5, Sep. 1965.

* cited by examiner

DUAL POLARIZED ANTENNA WITH DUAL FEED AND CROSS POLARIZATION ISOLATION

BACKGROUND

Radar systems and communication systems send and receive radio signals via transmitting and receiving antennas. Some antennas are formed as a linear array of emitters to transmit and receive radio signals. The linear array allows for beamforming, in which the same signal is received with a different phase at each antenna element. The phase difference determines a direction for the beam. The linear array also allows for Multiple Input, Multiple Output (MIMO) techniques to create virtual antennas. The transmitted and received signals may have a specific polarization. A receiving antenna with a specific polarization may filter out signals that have a different polarization. For a radar, some objects can be detected more clearly with a particular polarization as compared to another polarization because those objects reflect a particular polarization better than other polarizations. Accordingly, a radio system may switch from one polarization to the other in order to isolate two different signals.

SUMMARY

A dual polarized antenna is described with a dual feed that is suitable for cross polarization isolation. In an embodiment, an antenna has a waveguide having a first rectangular face at an end, a second rectangular face at a second opposite end, and a radiating face between the first rectangular face and the second rectangular face. A first feed is configured to feed a first radio signal having a first polarization into the waveguide. A second feed is configured to feed a second radio signal having a second polarization orthogonal to the first polarization into the waveguide. A first plurality of polarized emitters on the radiating face are arranged in a first line along the radiating face to emit the first radio signal, and a second plurality of polarized emitters on the radiating face are arranged in a second line along the radiating face to emit the second radio signal.

In an embodiment, the polarized emitters of the second plurality of polarized emitters are orthogonal to the polarized emitters of the first plurality of polarized emitters. In an embodiment, the polarized emitters of the first plurality of polarized emitters are formed as linear slots through the radiating face. In an embodiment, the radiating face comprises a conductive material and the linear slots are formed through the conductive material.

In an embodiment, the polarized emitters of the second plurality of polarized emitters are formed as linear slots through the radiating face orthogonal to the linear slots of the polarized emitters of the first plurality of polarized emitters. In an embodiment, the waveguide has a waveguide axis that extends through the waveguide between the first rectangular face and the second rectangular face and wherein the linear slots of the first plurality of polarized emitters are parallel to the waveguide axis and the linear slots of second plurality of polarized emitters are perpendicular to the waveguide axis.

In an embodiment, the polarized emitters of the first plurality of polarized emitters are separated by a distance of one guided wavelength of the first radio signal. In an embodiment, the linear slots of the first plurality of polarized emitters have a length of one half of a guided wavelength of the first radio signal.

In embodiments, a first waveguide adapter is coupled between the first feed and the waveguide, wherein the first waveguide adapter is configured as a reflector of the second radio signal from the second feed into the waveguide, and a second waveguide adapter is coupled between the second feed and the waveguide, wherein the second waveguide adapter is configured as a reflector of the first radio signal from the first feed into the waveguide.

In an embodiment, the first waveguide adapter is trapezoidal having a first rectangular cross section with unequal adjacent sides and the second waveguide adapter is trapezoidal having a second rectangular cross section with unequal adjacent sides. In an embodiment, a vertical side of a cross section of the first waveguide adapter is longer than a horizontal side of the cross section of the first waveguide adapter and a horizontal side of the cross section of the second waveguide adapter is longer than a vertical side of the cross section of the second waveguide adapter.

In an embodiment, the waveguide is in a shape of a rectangular parallelepiped with parallel walls. In an embodiment, the first rectangular face and the second rectangular face are parallel and wherein a width of the first rectangular face is equal to the width of the second rectangular face. In an embodiment, the first rectangular face and the second rectangular face are square.

In an embodiment, an apparatus includes a first rectangular waveguide having a first rectangular face at an end, a second rectangular face at a second opposite end, and a radiating face between the first rectangular face and the second rectangular face, a second rectangular waveguide having a first rectangular face at an end, a second rectangular face at a second opposite end, and a radiating face between the first rectangular face and the second rectangular face, a first feed coupled to the first rectangular face of the first rectangular waveguide, the first feed configured to feed a first radio signal having a first polarization into the first rectangular waveguide, a second feed coupled to the first rectangular face of the second rectangular waveguide, the second feed configured to feed a second radio signal having the first polarization into the second rectangular waveguide, a first plurality of polarized emitters on the radiating face of the first rectangular waveguide arranged in a line along the radiating face to emit the first radio signal, and a second plurality of polarized emitters on the radiating face arranged in a line along the radiating face to emit the second radio signal, wherein the first rectangular waveguide and the second rectangular waveguide are parallel and offset along an axis of the first rectangular waveguide.

In an embodiment, the axis of the first rectangular waveguide is a longitudinal axis form the first rectangular face to the second rectangular face. In an embodiment, the first radio signal and the second radio signal are a same radio signal, wherein the first feed and the second feed are both coupled to a same radio source wherein the first feed and the second feed are energized with the same radio signal.

An embodiment includes a third feed coupled to the first rectangular waveguide, the third feed configured to feed a third radio signal having a second polarization into the first rectangular waveguide, a first feed adapter coupled to the first feed of the first rectangular waveguide and coupled to the first rectangular waveguide, the first feed adapter configured to conduct the first radio signal and to reflect the third radio signal, a fourth feed coupled to the second rectangular waveguide to feed a fourth radio signal having a second polarization into the second rectangular waveguide and, a second feed adapter coupled to the first feed of the second rectangular waveguide and coupled to the second rectangular waveguide, the second feed adapter configured to conduct the second radio signal and to reflect the fourth radio signal.

In an embodiment, the first rectangular waveguide comprises a solid dielectric material coated with a conductive material and wherein the first plurality of polarized emitters comprises linear slots formed through the conductive material.

In an embodiment an antenna includes a rectangular waveguide having a first rectangular face at an end, a second rectangular face at a second opposite end, and a radiating face between the first rectangular face and the second rectangular face, the waveguide being conductive and filled with a dielectric; a first feed configured to feed a first radio signal having a horizontal polarization into the waveguide, a first feed adapter coupled to the first feed on one side and the waveguide on the other side, the first feed adapter being tapered from the size of the waveguide to the first feed, a second feed configured to feed a second radio signal having a vertical polarization into the waveguide, wherein the vertical polarization is orthogonal to the horizontal polarization, a second feed adapter coupled to the second feed on one side and the waveguide on the other side, the second feed adapter being tapered from the size of the waveguide to the second feed, so that the second feed adapter is a reflector of the first radio signal, a first plurality of polarized emitters arranged in a first line along the radiating face to emit the first radio signal, the first plurality of polarized emitters being configured as linear slots of equal length cut through the radiating face; and a second plurality of polarized emitters on the radiating face arranged in a second line along the radiating face to emit the second radio signal, the second plurality of polarized emitters being configured as linear slots of equal length cut through the radiating face perpendicular to the first plurality of polarized emitters.

Other aspects in accordance with the invention will become apparent from the following detailed description, taken in conjunction with the accompanying drawings, illustrated by way of example of the principles of the invention

DETAILED DESCRIPTION

Figure 1:
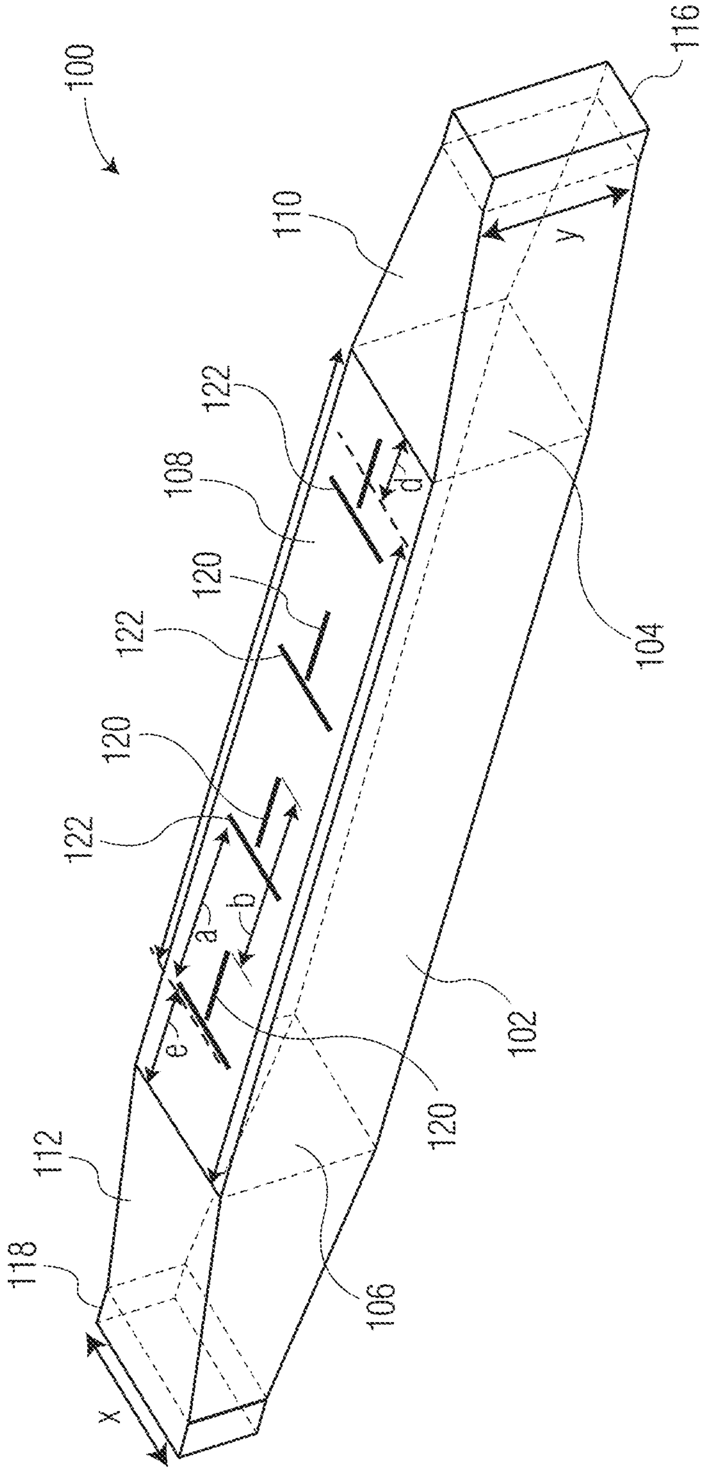
FIG. 1 is an isometric view of an example antenna.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment. As described herein, a single dual polarized antenna supports two simultaneous perpendicular polarizations, e.g. horizontal and vertical, to offer smaller dimensions, extremely low interference, reduced clutter reflections and more information about objects in a scene.

To support both vertical and horizontal polarization, a vertical polarized antenna and a separate horizontal polarized antenna have been used. This provides excellent separation between the two signals. For a linear array, each antenna is coupled to a waveguide that provides the radio signal to the antenna elements and receives radio signals from each antenna element. The linear array allows for beamforming, in which the same signal is received with a different phase at each antenna element. The phase difference determines a direction for the beam. The linear array also allows for Multiple Input, Multiple Output (MIMO) techniques to create virtual antennas In embodiments, to support both vertical and horizontal polarization, a vertical polarized antenna and a separate horizontal polarized antenna may be combined in one compact waveguide using a separate feed for each antenna to provide excellent separation between the two signals. Alternatively, the antenna may be used for beamforming and MIMO communications. In embodiments, the antenna has two opposite feeding ports. This allows the feeds to switch between the two polarizations which can be used to reduce interference from other radars. The two feeds may be used to separate the horizontal polarized reflections from the vertical polarized reflections.

Both modes may also be excited simultaneously due to the orthogonality of both waves propagating in both directions of the waveguide. The two feeding ports are independent of each other and the radiating slots for the two modes are independent of each other so that the characteristics for each polarization mode (such as the field of view (FOV), gain, sidelobes, etc.) can be designed independently. The antenna is able to be configured as two antennas in one structure. Even the center of phase of each polarization mode may be located separately, which is particularly useful for designing virtual elements of a MIMO radar. The described antenna has low losses due to the orthogonal feeding ports which function as a reflector for the orthogonal mode and provides very low leakage with high isolation.

FIG. 1 is an isometric view of an example antenna 100 according to some embodiments. The antenna 100 has a waveguide 102 in the shape of a rectangular parallelepiped with a first rectangular face 104 for horizontal polarization at one end of the waveguide and a second rectangular face 106, parallel to the first rectangular face 104, for vertical polarization at an opposite end of the waveguide. The first rectangular face 104 and the second rectangular face 106 are parallel to each other and have the same dimension of length, y, and the same dimension of height, x. The length and height may be equal as for a square, as shown, or different as for a different rectangle to suit different implementations. The waveguide between the first and second rectangular faces has a rectangular cross section with four parallel walls or faces connecting the first and second rectangular faces.

The waveguide is fed from one side with first radio signal by a horizontal waveguide adapter 110 at the first rectangular face 104 and from the other side with a second radio signal by a vertical waveguide adapter 112 at the second rectangular face 106. Waves propagate along a waveguide axis. The waveguide axis extends through the waveguide between the first rectangular face 104 and the second rectangular face 106. The waveguide is cut on a radiating face 108 at what is shown as the top surface to have two sets of radiating slots described in more detail below. In some embodiments, some of the slots are linear slots and are elongated in a direction parallel to the waveguide axis and some of the slots are linear slots and are elongated in a direction perpendicular to the direction of propagation.

The horizontal waveguide adapter 110 is coupled to the first rectangular face 104 on one side and is coupled to a first feed, in this example, a horizontal feed 116, on the other side, to feed the waveguide 102 with a horizontal polarized wave through the horizontal waveguide adapter 110. A first radio signal source (not shown) is coupled to the horizontal feed 116 so that the horizontal feed feeds the first radio signal having a first polarization into the waveguide. The feed is shown here in a simplified form and represents a coupler between the horizontal waveguide adapter and a signal source. The signal source may include oscillators, mixers, couplers, feedhorns and polarizers to generate and carry the first radio signal to the waveguide adapter. Similarly, the second rectangular face 106 is coupled to a second feed, in this example a vertical feed 118 through the vertical waveguide adapter 112 from the other end. Like the horizontal feed 116, the vertical feed 118 represents a coupler. A horizontal polarized signal is injected by the horizontal feed 116 into the waveguide. A second radio signal source (not shown) is coupled to the vertical feed 118. The second feed feeds the second radio signal having a second polarization into the waveguide. The waveguide adapters have a trapezoidal form from the respective rectangular face of the waveguide with a transition to a respective feed. The vertical feed 118 allows only vertical polarized waves to pass through. In this way, the vertical feed reflects the wave coming from the opposite 90° rotated horizontal feed 116 back to the horizontal feed 116. Similarly, at the opposite end of the waveguide, the 90° rotated vertical waveguide adapter 112, being trapezoidal, will reflect back the wave coming from the horizontal waveguide adapter 110 because it has a rotated polarization. Using a waveguide with a square cross section and waveguide adapters that taper from the waveguide to respective orthogonal feeds, the isolation between the two feeds 116, 118 is as high as −35 dB. This suggests a very high reflectivity at each end providing low leakage.

As shown, in some embodiments, the first waveguide adapter, e.g. the horizontal waveguide adapter 110, is coupled between the first feed 116 and the waveguide 102. The first waveguide adapter is also configured to be a reflector of the second radio signal from the second feed 118 into the waveguide. The second waveguide adapter, e.g. the vertical waveguide adapter 112, is coupled between the second feed 118 and the waveguide 102. The second waveguide adapter is configured to be a reflector of the first radio signal from the first feed 116 into the waveguide 102. In embodiments, the first waveguide adapter and the second waveguide adapter are trapezoidal with respective rectangular cross sections. The rectangular cross sections have unequal adjacent sides to carry the horizontal or vertical polarization. As shown, a vertical side of the cross section of the first waveguide feed is longer than a horizontal side of the cross section of the first waveguide feed. In a similar way, a horizontal side of the cross section of the second waveguide feed is longer than a vertical side of the cross section of the second waveguide feed. The first rectangular cross section with unequal adjacent sides may have the same dimensions as the second rectangular cross section with unequal adjacent sides but rotated by a right angle.

The reflection from each end of the waveguide allows two standing waves to be generated inside the waveguide which will excite the linear slots. With two simultaneous standing waves with different forms or patterns, two different surface current distributions will co-exist at each of the four walls of the waveguide including the radiating face 108 shown as the top surface which includes the radiating slots. A first set of polarized emitters 120 are formed in the top surface as linear slots that are cut through the surface of the waveguide and extend parallel to the waveguide axis. These linear slots all extend in a parallel direction and may be linearly aligned or placed in offset positions to suit particular implementations. The first set of polarized emitters 120 are for horizontal polarized radiation and may operate as transmit elements, receive elements, or both. The first set of polarized emitters are configured to emit the first radio signal with the first polarization. As shown, the first set of polarized emitters are arranged in a first line along the radiating face 108 of the waveguide to form a linear antenna element array. In some embodiments, the emitting elements are all the same length and width, as shown, in order to simplify the use of the antenna.

A second set of polarized emitters 122 are formed in the radiating face 108 as linear slots that are cut through the surface of the top surface of the waveguide and extend perpendicular to the propagation axis of the waveguide. The second set of polarized emitters 122 are arranged in a second line along the radiating face 108 of the waveguide to form another linear antenna element array for vertical polarized radiation. The linear slots are elongated and extend perpendicular to the first set of polarized emitters and perpendicular to the axis of the waveguide to cut the current distribution at its maximum. The second set of polarized emitters are configured to emit the second radio signal with the second polarization. The second set of polarized emitters radiate due to the generated standing wave from the vertical feed 118. The linear slots of the first set of polarized emitters 120, parallel to the waveguide, are parallel to the direction of the other current distribution generated by the vertical feed. The linear slots of the first set of polarized emitters may be placed where that current density generated by the second feed is a minimum in order not to disturb the vertical polarization mode and cause unwanted vertical polarized radiation.

Each of the two sets of polarized emitters may be configured as a separate array of antenna elements. The first set of polarized emitters 120 are configured as antenna elements parallel to the waveguide for horizontal polarization. These may be separated by a distance equal to one guided wavelength of the guided wavelength received from the horizontal feed 116 (shown as "b" in FIG. 1). A waveguide filled with a material (rather than air) can be used to reduce the separation distance between those slots. The second set of polarized emitters 122 are configured as perpendicular linear slots for vertical polarization and may be separated by a distance equal to one guided wavelength of the guided wavelength received from the vertical feed 118 (shown as "a" in FIG. 1). A waveguide filled with a material (rather than air) can be used to reduce the separation distance between those slots. In some embodiments, the linear slots have a length one half of a guided wavelength or $\lambda_0/2$, where $\lambda_0$ is the free-space guided wavelength of the antenna operating frequency. The radiating face 108 is at the top with respect to the drawing figure but, in use, this radiating face may be oriented in any direction. For vehicle operations, the radiating face may be directed toward a front of the vehicle to detect objects in front of the vehicle or to the rear or sides.

The waveguide 102 and the waveguide adapters 110, 112 may be formed of any suitable material that is appropriate for the wavelengths that are transmitted and received through the polarized emitters. In some embodiments, the waveguide is formed of a conductive material, for example a metal such as copper, iron, or aluminum. The waveguide may be hollow and filled with a dielectric such as air, a glass, or a plastic. The waveguide may be in the form of an empty box or outer shell, filled with dielectric. In some embodiments, the waveguide and the adapters may be formed of a solid dielectric material that is coated with a conductive material. The waveguide and adapters may be made of different materials selected for suitable coupling with each other and with the feeds 116, 118. The linear slots may be formed by cutting through the conductive material to form linear slots through the conductive material.

Figure 2:
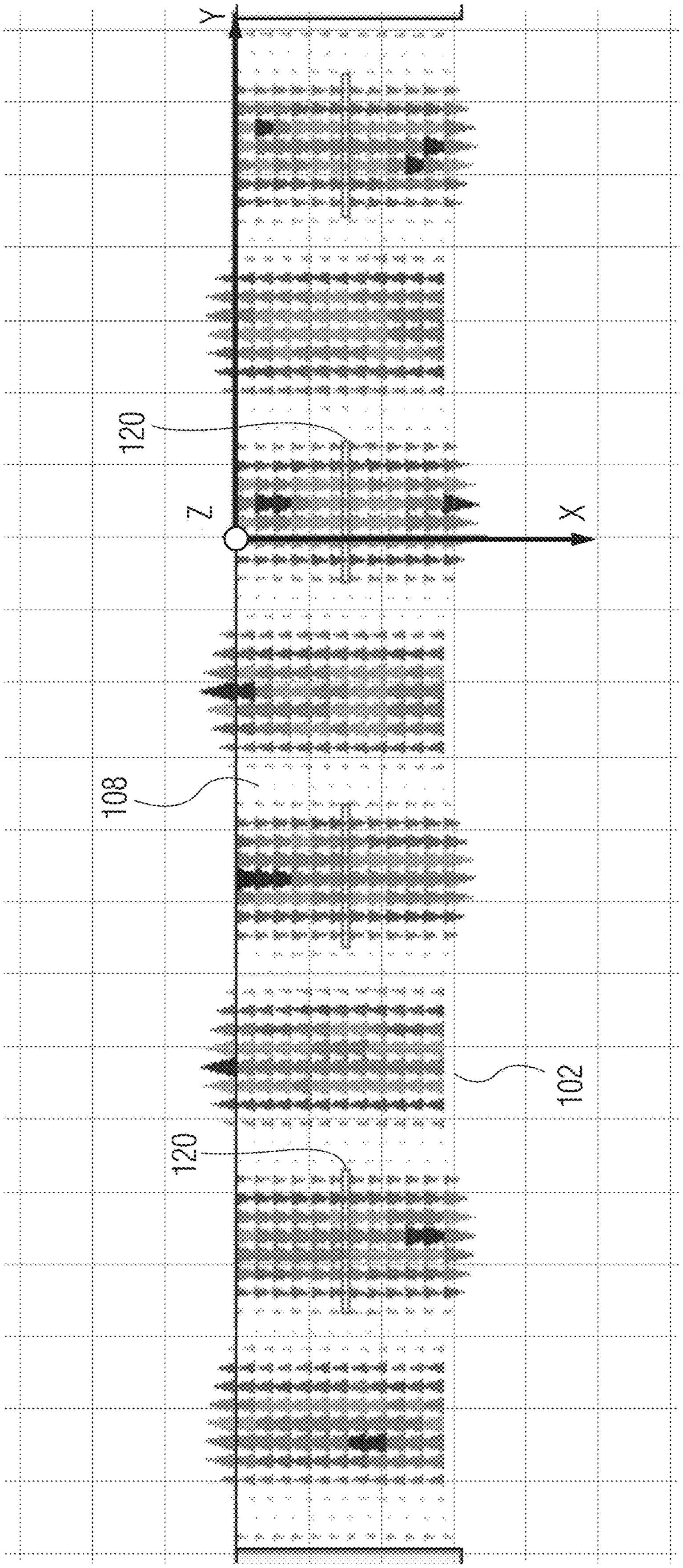
FIG. 2 is a topographical graph of current distribution from horizontal polarized waves on parallel linear slots of the antenna of FIG. 1.

FIG. 2 is a topographical graph of current distribution from horizontal polarized waves on parallel linear slots. In particular, the current distribution is shown on the radiating face 108 in response to being energized by horizontal polarized waves from the horizontal feed 116. Only the response of the parallel linear slots that comprise the first set of polarized emitters 120 are shown. The emitter positions correspond to the power peak positions. The power peaks exist at a distance of one guided wavelength of the horizontal polarized radio signal. The axes x and y of FIG. 2 are coordinate axes and are not directly relate to the coordinate axes of FIG. 1.

Figure 3:
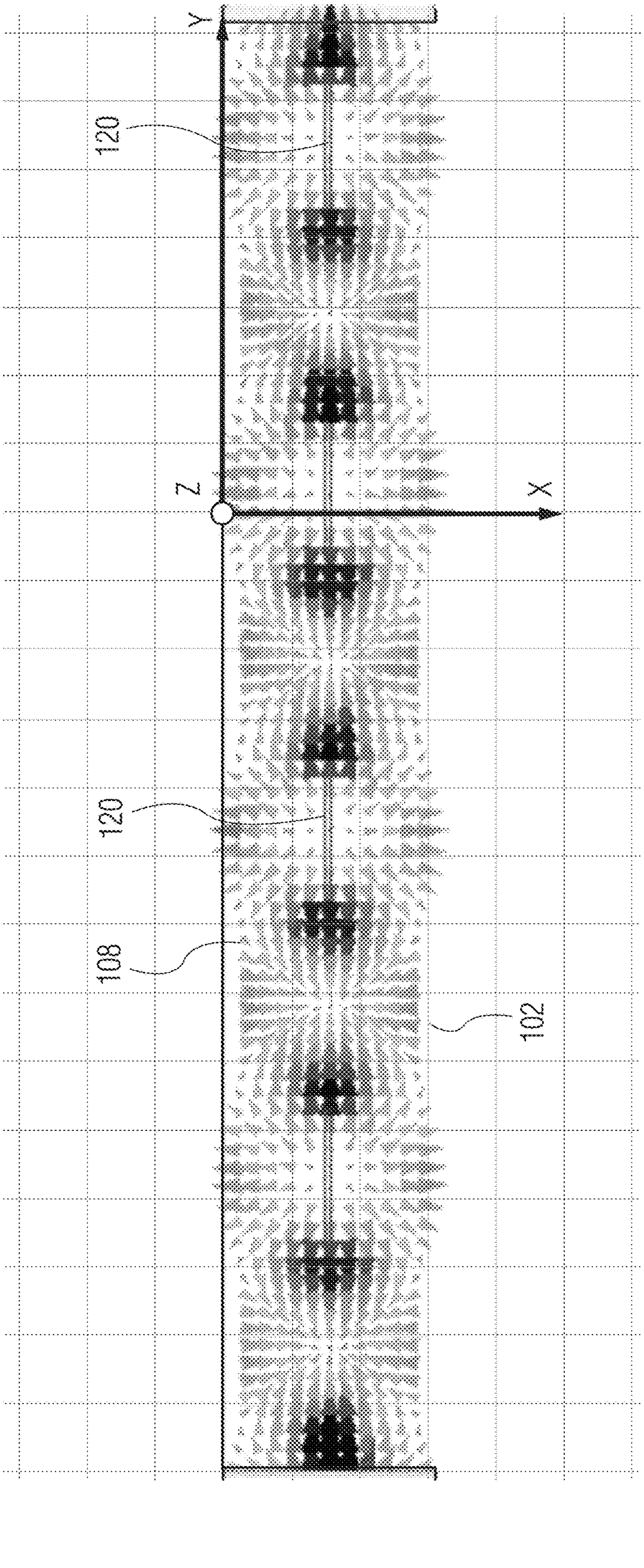
FIG. 3 is a topographical graph of current distribution from vertical polarized waves on parallel linear slots of the antenna of FIG. 1.

FIG. 3 is a topographical graph of current distribution from vertical polarized waves on parallel linear slots. In particular, the current distribution is shown superimposed on the radiating face 108 of the waveguide for the same parallel linear slots of the first set of polarized emitters 120 in response to being energized with vertical polarized waves from the vertical feed 118. The horizontal polarization slots are placed at the spots of the radiating face 108 where the current distribution generated by the vertical feed 118 has weak power in order to reduce the cross polarization. Cross polarization comes from the vertically polarized emission due to the horizontal polarized slots.

Figure 4:
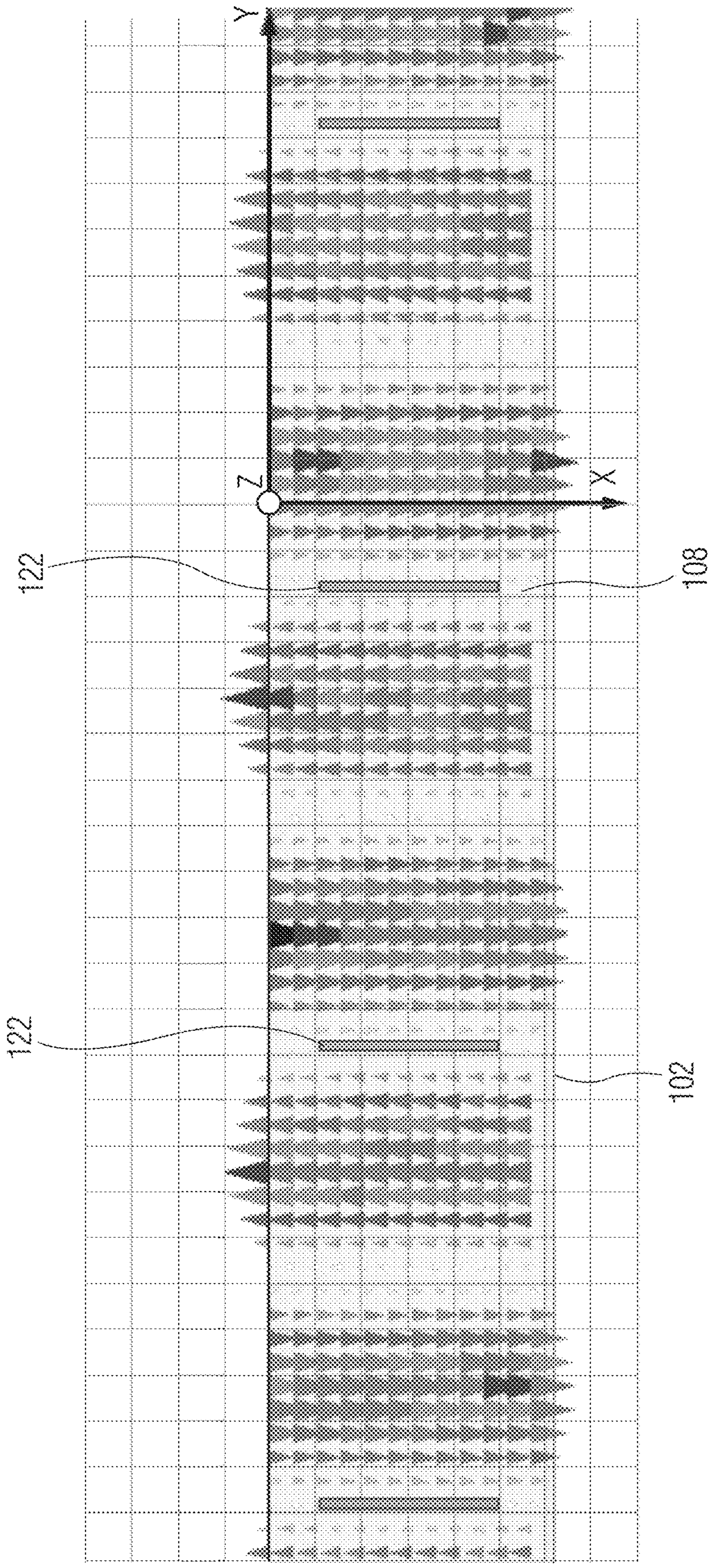
FIG. 4 is a topographical graph of current distribution from horizontal polarized waves on perpendicular linear slots of the antenna of FIG. 1.

FIG. 4 is a topographical graph of current distribution from horizontal polarized waves on perpendicular linear slots. In particular, the current distribution is shown superimposed on the radiating face 108 of the waveguide with only perpendicular slots that comprise the second set of polarized emitters 122 in response to being energized with horizontal polarized waves from the horizontal feed 116. The vertical polarization slots are placed at the spots of the radiating face 108 where the current distribution generated by the horizontal feed 116 has weak power in order to reduce the cross polarization. Cross polarization in this case is the horizontal polarized emission due to vertical polarized slots.

Figure 5:
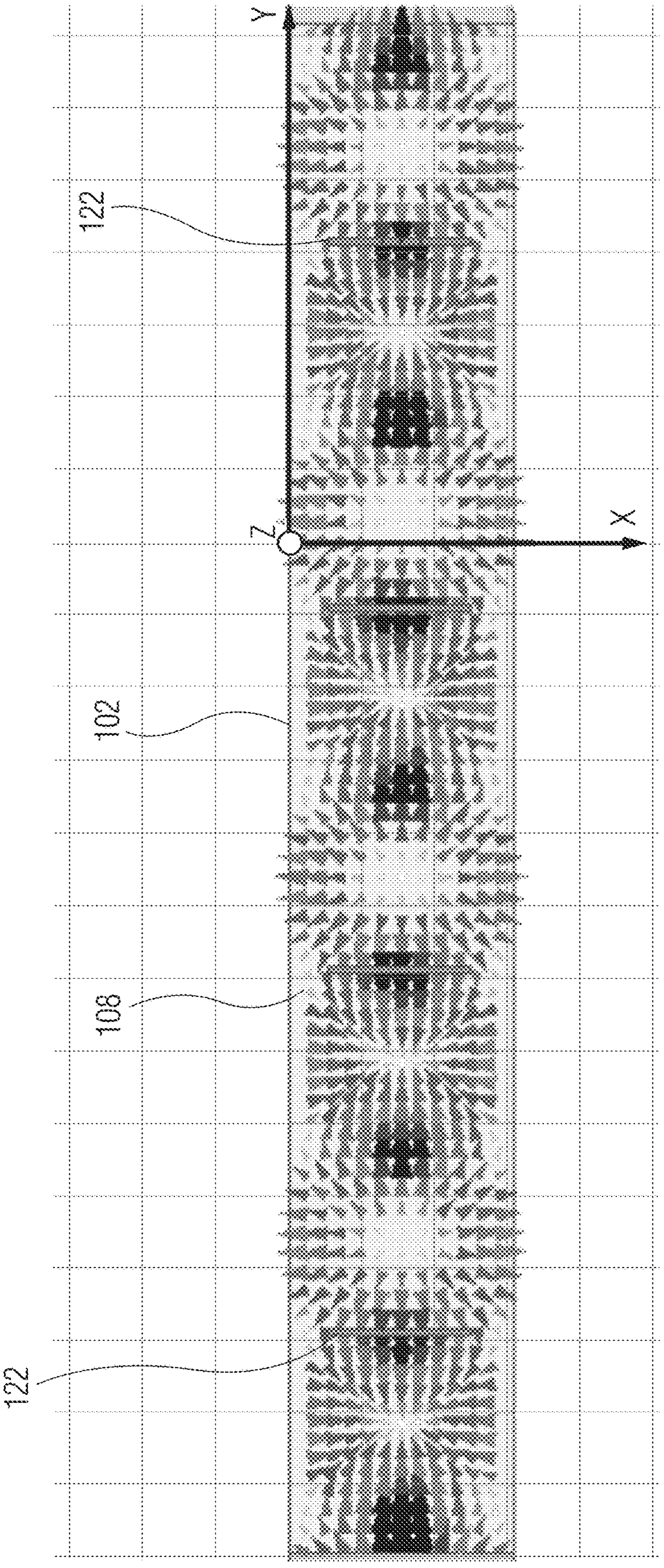
FIG. 5 is a topographical graph of current distribution from vertical polarized waves on perpendicular linear slots of the antenna of FIG. 1.

FIG. 5 is a topographical graph of current distribution from vertical polarized waves on perpendicular linear slots. In particular, the current distribution is shown superimposed on the radiating face 108 of the waveguide with only perpendicular slots that comprise the second set of polarized emitters 122 in response to being energized with vertical polarized waves from the vertical feed 118. The slot positions correspond to the power peak positions of the current distribution from the vertical feed 118. The power peaks exist at a distance of one guided wavelength of the guided wavelength of the vertical polarized radio signal.

The linear slots for horizontal polarized radiation are placed perpendicular to cut the current distribution of the horizontal polarization energization signal at its maximum as shown in FIG. 2. At the same time, the parallel linear slots are parallel to the direction of flow of the other current distribution generated by the vertical feed as shown in FIG. 3. The parallel linear slots can be placed where that current is a minimum in order not to disturb the other mode and cause unwanted vertical polarized radiation. As a result, a high polarization purity, also referred to a good axial ratio is provided. In addition, the antenna provides a high isolation between the vertical and horizontal polarization signals. In some embodiments, the isolation is more than −34 dB.

The structures described herein may be modified to suit different purposes. In some embodiments, the aperture size as determined, for example, by the number of parallel linear slots can be changed independently of the aperture size as determined by the number of perpendicular slots by changing the waveguide dimensions. Similarly, the number of linear slots of the vertical polarized antenna can be changed independently from that of the horizontal polarized antenna by changing the waveguide dimensions. In some embodiments, the aperture center of the horizontal polarized antenna as determined, for example, by the phase center of the array, or of the vertical polarized antenna may be changed independently of the other. This is in part because the location of the standing wave peak for a respective feed depends on the waveguide dimensions.

The location of the side lobes of the radiation pattern for both polarizations may also be changed by changing the cross-sectional dimensions of the waveguide, for example the x and y dimensions of the faces 104 and 106. These dimensions may be adjusted to determine the current distribution and guided wavelength of each mode and thereby the distance between the linear slots.

In some embodiments, a tapering function may be applied to the linear slots of the antenna array by reducing the length of each slot by an amount that increases with distance from the phase center. The length of a slot determines its relative radiating power.

The signal feeds may be modified to suit different applications. As shown each waveguide may receive a different feed on each side so that the antenna is fed by two independent sources. Alternatively a single source may be coupled to a two-port power divider to split the input power between the first feed and the second feed. A waveguide twist may be used to rotate the polarization of one of the feeds.

In some embodiments, an array can be built by combining two or more columns, each of which provide dual (horizontal and vertical) polarization. Stacking two waveguides of a type as shown in FIG. 1, allows any ambiguity from grating lobes to be resolved and provides additional operational modes that may allow for enhanced resolution or signal fidelity.

In some embodiments, the antenna radiates a pattern which presents grating lobes in one plane of the radiation pattern from the antenna. This is more likely when a single array of linear slots is used as the polarized emitters. The grating lobes may result in areas in which the angular position of a target in the scene cannot be unambiguously resolved. Currently, there are signal processing techniques that are able to resolve the ambiguity. Modifications may also be made to the physical structure of the antenna to overcome the grating lobes.

As an example, two linear arrays of polarized emitters may be used. Some techniques for resolving the ambiguities in the grating lobe regions are described below. In some embodiments, the phase difference between the horizontal and vertical polarized received signals resolves the ambiguities. The phase difference between the horizontal and vertical polarized antenna is given by β which may be defined as:

$$\beta=(2\pi/\lambda)d \sin \theta,$$

where θ is the impinging angle of the received signals at the antenna array and d is the distance between the phase centers of the two antennas, the vertical polarized antenna, and the horizontal polarized antenna, respectively.

Whether the object is located in a lobe at the main field of view of the radar receiver or another lobe, the object will appear at both locations of the detection map and for both antennas. By processing the phase shift between the two antennas for that target, the target can be located within the field of view and tracked. Alternatively, the object can be located outside the field of view and ignored. However, in the rare instance of two objects with the same range, speed, and azimuth angle, there may still be ambiguity.

In some embodiments, the phase shift between the received signal with a same polarization at different antennas with different feeds resolves the ambiguity. This approach uses two or more neighboring antennas that have the same polarization but that have separated feeds. The phase shift between the received signals is used to resolve the ambiguity. By introducing a displacement, d, between the phase centers of two or more columns or linear arrays, the object can be located within or outside the radar's field of view (FoV).

Figure 6:
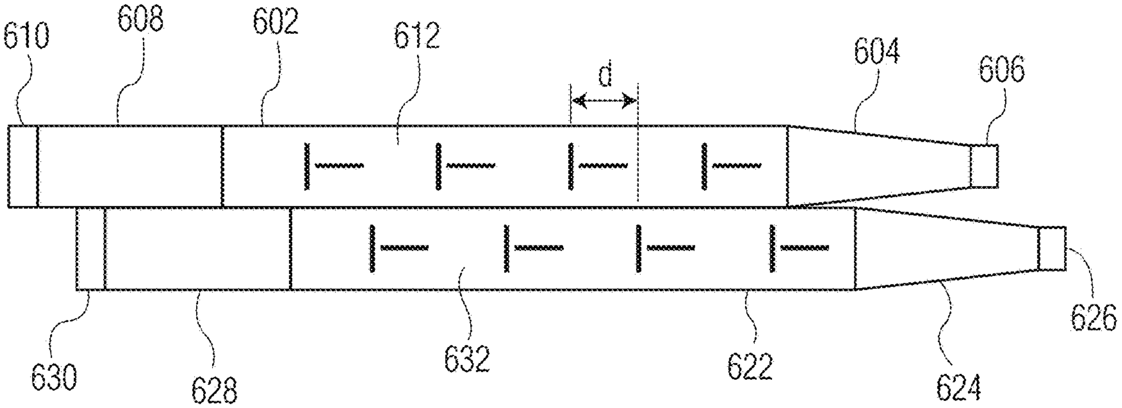
FIG. 6 is a plan view diagram of radiating faces of two columns each with a separate feed.

FIG. 6 is a plan view diagram of radiating faces of two columns each with a separate feed. A two antennas are configured similar to that of FIG. 1 but are offset by a distance d. While two columns are shown, more columns may be used each with a corresponding offset. The first antenna has a first waveguide 602 coupled to a first feed adapter 604. The first feed adapter 604 is coupled to the first waveguide 602 on one side and is coupled to a feed 606 on the other side. The first feed adapter 604 tapers from the size of the waveguide to receive signals with a first polarization from the feed 606 at the other end of the waveguide. The opposite end of the waveguide 602 has a second feed adapter 608 that is coupled to the that tapers in an orthogonal direction to receive signals with a second orthogonal polarization from a second feed 610. The feed adapters are configured to be reflectors of signals from the respective opposite feed adapter so that two standing waves are generated, one for each polarization. The waveguide 602 has a radiating face 612 with a linear array of antenna elements for the two standing waves. The elements are shown as linear slots in which the parallel linear slots are for one polarization direction and the perpendicular linear slots are for the other orthogonal polarization direction.

A second waveguide 622 is also coupled to a first feed adapter 624 that tapers from the size of the waveguide to receive signals with the first polarization from a first feed 626 at one end of the second waveguide 622. The first feed adapter 624 is coupled to the second waveguide 622 on one side and is coupled to the feed 626 on the other side. The opposite end of the second waveguide 622 has a second feed adapter 628 that tapers in an orthogonal direction to receive signals with the second orthogonal polarization from a second feed 630. A radiating face 632 of the second waveguide 632 has a linear array of antenna elements for the two standing waves. The elements are in the form of parallel linear slots and perpendicular linear slots.

The two waveguides are offset by a distance shown as d. The polarized emitters are configured in the same locations on the respective radiating faces, such that the distance of one or more of the linear slots from the respective feed horn is the same on both radiating faces of the two waveguides. The offset causes the linear slots of one radiating face to be offset by the distance d from the corresponding linear slots of the other radiating face. A direct calculation may be made to process the phase difference between the signals received at elements of the first waveguide 602 and corresponding elements of the second waveguide 622. Alternatively, more advanced calculations may be used to process the phase from multiple Rx antennas (e.g. by Fast Fourier Transform (FFT)) and then removing the ambiguity.

The configuration of FIG. 6 shows stacked arrays each with two independent feeds for a total of four signal feeds, two for the vertical polarization on one side of the waveguides and two for the horizontal configuration on the other side of the waveguide. In alternative embodiments, one or more of the signal feeds may be combined. In some embodiments, the phase shift between two displaced antennas with the same feed resolves the grating lobes ambiguity. The received signals from two or more columns that have the same feed, e.g. a shared feed, may be combined.

Figure 7:
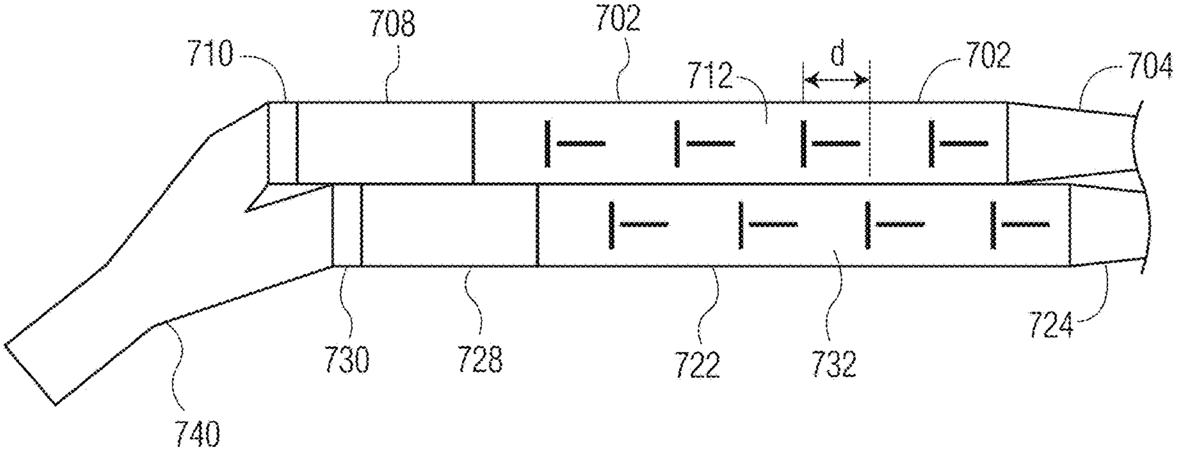
FIG. 7 is a plan view diagram of radiating faces of two columns each with a shared feed on one side.

FIG. 7 is a plan view diagram of radiating faces of two columns each with a shared feed on one or both sides. As in the example of FIG. 6, more columns may be used each with a corresponding offset. A power divider may be used as shown in this FIG. 7 or separate feeds as in FIG. 6. A first antenna is configured similar to that of FIG. 1. The first antenna has a first waveguide 702 coupled to a first feed adapter 704 that tapers from the size of the waveguide to receive signals with a first polarization from a feed (not shown) at one end of the waveguide. The opposite end of the first waveguide 702 has a second feed adapter 708 that tapers in an orthogonal direction to receive signals with a second orthogonal polarization from a second feed 710. The feed adapters are configured to be and operate as reflectors of signals from the respective opposite feed adapter so that two standing waves are generated, one for each polarization. The first waveguide 702 has a radiating face 712 with a linear array of antenna elements for the two standing waves.

A second waveguide 722 is also coupled to a first feed adapter 724 that tapers from the size of the waveguide to receive signals with the first polarization from a feed (not shown) at one end of the second waveguide 722. The opposite end of the second waveguide 722 has a second feed adapter 728 that tapers in an orthogonal direction to receive signals with the second orthogonal polarization from a second feed 730. A radiating face 732 of the second waveguide 732 has a linear array of antenna elements for the two standing waves. The second feed 710 of the first waveguide 702 and the second feed 730 of the second waveguide are both coupled to the same radio source 740 wherein both feeds are energized with the same signal. The opposite feed guides may also have the same or a different source. The elements are shown as linear slots in which the parallel linear slots are for one polarization direction and the perpendicular linear slots are for the other orthogonal polarization direction. The elements are in the form of parallel and perpendicular linear slots. The two waveguides are offset by a distance shown as d.

The two columns, as shown, or more columns may be combined for midrange and long-range applications in any of a variety of different ways to suit different applications. By combining two signals and compensating for the phase shift between the two columns based on the distance, d, the ambiguities of a single column can be removed. Alternatively, each waveguide may use only the single shared feed to generate a standing wave in each waveguide that depends on the unique characteristics of the first and second feed, respectively.

The described structures provide a compact antenna with dual polarization and high isolation between the polarization modes. Two orthogonal standing waves and two orthogonal current distributions may be generated simultaneously in a single waveguide. The radiation modes may be modified by changing the shape and dimensions of the antenna elements. In some embodiments, the distance between the horizontal linear slots is given by the same guided wavelength calculated from the waveguide height and the distance between the vertical linear slots is given by the same guided wavelength calculated from the waveguide width. The functional wavelengths may be modified by filing the waveguide with different dielectric materials such as air, plastics, glasses, etc.

As described for some embodiments, the feeds are perpendicular to each other and the generated polarization modes are orthogonal to each other. These are both provided in a single waveguide. The trapezoidal feed adapters are used as reflectors for the orthogonal signal feed from the other side. The reflector generates a standing wave. The radiating face of the waveguide has linear slots that define the elements of the antenna array. The linear slots of one polarization mode can be placed parallel to the current distribution of the second polarization. This increases the isolation between the horizontal and vertical polarization.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An antenna comprising:

a waveguide having a first rectangular face at a first end, a second rectangular face at a second end opposite the first end, and a radiating face between the first rectangular face and the second rectangular face;

a first feed configured to feed a first radio signal having a first polarization into the waveguide;

a second feed configured to feed a second radio signal having a second polarization orthogonal to the first polarization into the waveguide, wherein the first feed has a first oblong rectangular cross-section, the second feed has a second oblong rectangular cross-section, the first oblong rectangular cross-section is in a first plane, the second oblong rectangular cross-section is in a second plane, the first plane is parallel to the second plane, and the first oblong rectangular cross-section is rotationally offset from and aligned perpendicularly with respect to the second oblong rectangular cross-section;

a first waveguide adapter coupled between the first feed and the first rectangular face of the waveguide, wherein the first waveguide adapter is dimensioned to reflect the second radio signal from the second feed into the waveguide, and the first waveguide adapter is tapered from the first rectangular face of the waveguide to the first feed;

a second waveguide adapter coupled between the second feed and the second rectangular face of the waveguide, wherein the second waveguide adapter is dimensioned to reflect the first radio signal from the first feed into the waveguide, and the second waveguide adapter is tapered from the second rectangular face of the waveguide to the second feed;

a first plurality of polarized emitters on the radiating face arranged in a first line along the radiating face to emit the first radio signal; and a second plurality of polarized emitters on the radiating face arranged in a second line along the radiating face to emit the second radio signal.

2. The antenna of claim 1, wherein the polarized emitters of the second plurality of polarized emitters are orthogonal to the polarized emitters of the first plurality of polarized emitters.

3. The antenna of claim 1, wherein the polarized emitters of the first plurality of polarized emitters are formed as linear slots through the radiating face.

4. The antenna of claim 3, wherein the radiating face comprises a conductive material and the linear slots are formed through the conductive material.

5. The antenna of claim 3, wherein the polarized emitters of the second plurality of polarized emitters are linear slots formed through the radiating face orthogonal to the linear slots of the polarized emitters of the first plurality of polarized emitters.

6. The antenna of claim 5, wherein the waveguide has a waveguide axis that extends through the waveguide between the first rectangular face and the second rectangular face and wherein the linear slots of the first plurality of polarized emitters are parallel to the waveguide axis and the linear slots of second plurality of polarized emitters are perpendicular to the waveguide axis.

7. The antenna of claim 3, wherein the polarized emitters of the first plurality of polarized emitters are separated by a distance of one guided wavelength of the first radio signal.

8. The antenna of claim 7, wherein the linear slots of the first plurality of polarized emitters have a length of one half of a guided wavelength of the first radio signal.

9. The antenna of claim 1, wherein the first waveguide adapter is trapezoidal having a first rectangular cross section with unequal adjacent sides and the second waveguide adapter is trapezoidal having a second rectangular cross section with unequal adjacent sides.

10. The antenna of claim 9, wherein, a vertical side of a cross section of the first waveguide adapter is longer than a horizontal side of the cross section of the first waveguide adapter and a horizontal side of the cross section of the second waveguide adapter is longer than a vertical side of the cross section of the second waveguide adapter.

11. The antenna of claim 1, wherein the waveguide is in a shape of a rectangular parallelepiped with parallel walls.

12. The antenna of claim 1, wherein the first rectangular face and the second rectangular face are parallel and wherein a width of the first rectangular face is equal to the width of the second rectangular face.

13. The antenna of claim 12, wherein the first rectangular face and the second rectangular face are square.

14. An antenna comprising:

a rectangular waveguide having a first rectangular face at an end, a second rectangular face at a second opposite end, and a radiating face between the first rectangular face and the second rectangular face, the waveguide being conductive and filled with a dielectric;

a first feed configured to feed a first radio signal having a horizontal polarization into the waveguide;

a first feed adapter coupled to the first feed on one side and the first rectangular face of the rectangular waveguide on the other side, the first feed adapter being tapered from the size of the waveguide to the first feed;

a second feed configured to feed a second radio signal having a vertical polarization into the waveguide, wherein the vertical polarization is orthogonal to the horizontal polarization, wherein the first feed has a first oblong rectangular cross-section, the second feed has a second oblong rectangular cross-section, the first oblong rectangular cross-section is parallel to the second oblong rectangular cross-section, and the first oblong rectangular cross-section rotationally offset from and is aligned perpendicularly with respect to the second oblong rectangular cross-section;

a second feed adapter coupled to the second feed on one side and the second rectangular face of the rectangular waveguide on the other side, the second feed adapter being tapered from the size of the waveguide to the second feed, so that the second feed adapter is a reflector of the first radio signal;

a first plurality of polarized emitters arranged in a first line along the radiating face to emit the first radio signal, the first plurality of polarized emitters being configured as linear slots of equal length cut through the radiating face; and a second plurality of polarized emitters on the radiating face arranged in a second line along the radiating face to emit the second radio signal, the second plurality of polarized emitters being configured as linear slots of equal length cut through the radiating face perpendicular to the first plurality of polarized emitters.

15. The antenna of claim 1, wherein the first plurality of polarized emitters and the second plurality of polarized emitters are dimensioned and arranged such the antenna is characterized by a first radiation pattern for the first radio signal and by second radiation pattern for the second radio signal that differs from the first radiation pattern.

16. The antenna of claim 15, wherein the first radiation pattern has a different field of view from the second radiation pattern.

17. The antenna of claim 15, wherein the first radiation pattern has a different arrangement of sidelobes from the second radiation pattern.

18. The antenna of claim 17, wherein the first radiation pattern has a different number of sidelobes from the second radiation pattern or a different maximum sidelobe intensity from the second radiation pattern.

19. The antenna of claim 15, wherein the first radiation pattern has a different directivity from the second radiation pattern.

20. The antenna of claim 1, wherein the waveguide has a waveguide axis that extends through the waveguide between the first rectangular face and the second rectangular face;

wherein the first plurality of polarized emitters has a first phase center at a first location along the waveguide axis; and wherein the second plurality of polarized emitters has a second phase center at a second location along the waveguide axis that is different from the first location.

* * * * *